Patented June 9, 1925.

1,541,182

UNITED STATES PATENT OFFICE.

WALTER WILLIAM PLOWMAN, OF EAST SHEEN, ENGLAND.

GRADING OF ALKALINE-EARTH CARBONATES.

No Drawing. Application filed April 14, 1922. Serial No. 552,815.

*To all whom it may concern:*

Be it known that I, WALTER WILLIAM PLOWMAN, a subject of the King of England, residing in East Sheen, in the county of Surrey, England, have invented certain new and useful Improvements in the Grading of Alkaline-Earth Carbonates, of which the following is a specification.

The present invention relates to the grading of alkaline-earth carbonates.

Alkaline-earth carbonates may for practical purposes be regarded as ordinarily insoluble in common solvents.

I have found, however, that by the action of an appropriate reagent upon such a carbonate in a state of sub-division, the latter may be finely distributed throughout the liquid in which it is treated, and that under these conditions coarser material falls out and may be separated, while the alkaline-earth carbonate recovered from its liquid dispersion, hereinafter referred to as the suspension, is obtained in a finely-divided form. The treatment of alkaline-earth carbonates in this way therefore provides a means of obtaining them in a fine state of division, and the word "grading" as used herein in this specification and claims is intended to comprise treatment of these carbonates for this purpose itself, as well as for the purpose of removing associated material which does not pass into suspension when treated with the reagent in question.

According to this invention, a process for grading as defined of alkaline-earth carbonates comprises forming a suspension of the carbonate by admixture of the subdivided material to be graded with a dilute solution of an alkaline silicate, such as sodium- or potassium-silicate.

The proportion of alkaline silicate may be of the order of about 0.5 to 1.5 per cent, relatively to the weight of carbonate in the form of a 5 to 10 per cent fluid admixture of the latter.

The alkaline-earth carbonate may be recovered from its suspension in any suitable way, for instance, by addition to the suspension of a suitable flocculating reagent, for example, a solution of alum or of gelatine, such as a solution of glue, according to the circumstances of the case such as the particular carbonate to be precipitated.

In certain cases it may be advantageous to add the flocculating reagent so gradually, or in such total quantity relatively to the quantity of alkaline silicate employed for effecting the original suspension, that the sedimentation of the flocculated carbonate is retarded, in order to allow for separation from the latter of material not previously thrown out during the period of suspension.

The suspended carbonate may also be recovered, after separation, if necessary, from any deposited material, by evaporation of the suspension to dryness.

The following examples will serve to indicate how the invention may be carried into effect, it being understood that these examples are given for illustrative purposes and not by way of limitation

Example I.

A mixture of 120 lbs. of common whiting and 1554 lbs. of soft water, equivalent to a 7.5 per cent mixture, was run into a tank, and 1 lb. of sodium silicate in aqueous solution was added and the contents of the tank well mixed, and then left to stand for about 1 hour. At the end of that time there was a separation of the mixture into two regions, an under layer of solid material, and a supernatant suspension. The latter was drawn off into a second tank and was treated with 1 lb. of aluminium sulphate in the form of an aqueous solution, and the contents of the tank were then left to stand for about twenty-four to thirty-six hours. The supernatant liquor was then run off leaving a residue of very finely-divided alkaline-earth carbonate. From the first tank in which the treatment with silicate was effected about 48 pounds of deposit were recovered, the nature of which indicated its suitability for the preparation of abrasive compositions.

Example II.

The same quantity of Gilder's whiting was treated under similar conditions except that the reagent was potassium silicate. The carbonate was flocculated by addition to its suspension of a solution of glue (1 lb. of glue dissolved with 34 lbs. of water by weight). As in the case of the first example, there was obtained a very finely divided product, while about 38 lbs. of deposit remained in the first tank, A sample of precipitated chalk yielded a similar product, about 20 per cent of deposit remaining in the first tank.

*Example III.*

70 lbs. of commercial barium carbonate powder in 700 lbs. of soft water were treated with 1 lb. or sodium silicate in aqueous solution, and the mixture was left to stand for about one hour. A separation into two regions took place as before. The supernatant suspension was run off, 1 lb. of commercial alum in aqueous solution added and the mixture left to stand for several hours. A similar product was obtained as in the case of Example I.

*Example IV.*

To 200 lbs. of pulverized strontium carbonate admixed with 2000 lbs. of soft water was added 1 lb. of potassium silicate in aqueous solution, and the mixture was left to stand for about one hour. On addition to the suspension of an aqueous solution of 1 lb. of commercial alum and standing for several hours, the strontium carbonate was precipitated in the form of a very finely-divided product.

According to the degree of hardness of the water with which the alkaline-earth carbonate is mixed, it may be found necessary appropriately to adjust the proportion relatively to the latter of the alkaline silicate used for preparing the suspension.

Magnesium carbonate is included in the term alkaline-earth carbonate for the purpose of this invention.

I claim:—

1. In the process of grading as hereinbefore defined of alkaline-earth carbonates, the steps consisting of admixing the carbonate in a state of subdivision with water in presence of an alkaline silicate in quantity sufficient to effect deflocculation of the carbonate, separating the alkaline-earth carbonate suspension so produced from any undeflocculated material, and separating the carbonate from its suspension.

2. In the process of grading as hereinbefore defined of alkaline-earth carbonates, the steps consisting of admixing the carbonate in a state of subdivision with water in presence of an alkaline silicate in quantity sufficient to effect deflocculation of the carbonate, separating the alkaline-earth carbonate suspension so produced from any undeflocculated material, and separating the carbonate from its suspension by flocculation.

3. In the process of grading as hereinbefore defined of alkaline-earth carbonates, the steps consisting of admixing the carbonate in a state of subdivision with water in presence of an alkaline silicate in quantity sufficient to effect deflocculation of the carbonate, allowing the mixture so produced to stand to permit of deposition of undeflocculated material, separating the alkaline-earth carbonate suspension from the deposit, and recovering the carbonate from its suspension.

4. In the process of grading as hereinbefore defined of alkaline-earth carbonates, the steps consisting of admixing the carbonate with a dilute aqueous solution of an alkaline silicate containing substantially 0.50 to 1.50 per cent of the silicate relatively to the weight of the carbonate to be treated, separating the alkaline-earth carbonate suspension so produced from any undeflocculated material, and recovering the carbonate from its suspension.

5. In the process of grading as hereinbefore defined of calcium carbonate, the steps consisting of admixing the carbonate in a state of subdivision with water in presence of an alkaline silicate in quantity sufficient to effect the deflocculation of the carbonate, separating the calcium carbonate suspension so produced from any undeflocculated material, and recovering the carbonate from its suspension.

6. In the process of grading as hereinbefore defined of calcium carbonate, the steps consisting of admixing the carbonate in a state of subdivision with water in presence of sodium silicate in quantity sufficient to effect deflocculation of the carbonate, separating the calcium carbonate suspension so produced from any undeflocculated material, and recovering the carbonate from its suspension.

7. In the process of grading as hereinbefore defined of calcium carbonate, the steps consisting of admixing the subdivided carbonate with a dilute aqueous solution of sodium silicate containing substantially 0.50 to 1.50 per cent of the silicate relatively to the weight of calcium carbonate, separating the calcium carbonate suspension so produced from any undeflocculated material, and recovering the carbonate from its suspension.

8. In the process of grading as hereinbefore defined of calcium carbonate, the steps consisting of admixing the subdivided carbonate with water so as to provide a substantially 5 to 10 per cent mixture, admixing therewith a solution of alkaline silicate in quantity sufficient to give substantially 0.50 to 1.50 per cent of silicate relatively to the weight of the carbonate in the aqueous mixture, separating the carbonate suspension so produced from any undeflocculated material, and recovering the carbonate from its suspension.

9. In the process of grading as hereinbefore defined of calcium carbonate, the steps consisting of admixing the subdivided carbonate with water so as to provide substantially a 5 to 10 per cent mixture, admixing therewith a solution of sodium silicate in quantity sufficient to effect deflocculation of the calcium carbonate, separating the carbonate suspension so produced from any undeflocculated material, and recovering the carbonate from its suspension.

10. In the process of grading as hereinbefore defined of calcium carbonate, the steps consisting of admixing the subdivided carbonate with water so as to provide a substantially 5 to 10 per cent mixture, admixing therewith a solution of sodium silicate in quantity sufficient to give substantially 0.50 to 1.50 per cent of the sodium silicate relatively to the weight of carbonate in the aqueous mixture, separating the calcium carbonate suspension so produced from any undeflocculated material, and recovering the carbonate from its suspension.

In testimony whereof I have signed my name to this specification in the presence of two subscribing witnesses.

WALTER WILLIAM PLOWMAN.

Witnesses:
HARRY S. SLEDGE,
FRANK MOORE.